Aug. 27, 1957  E. OLSON  2,804,087
CARBURETOR FUEL VALVE ACTUATING MECHANISM
Filed June 7, 1954

INVENTOR.
ELMER OLSON
BY
Craig V. Morton
ATTORNEY

United States Patent Office 2,804,087  
Patented Aug. 27, 1957

2,804,087

CARBURETOR FUEL VALVE ACTUATING MECHANISM

Elmer Olson, Rochester, N. Y., assignor to General Motors Corporation, Detroit, Mich., a corporation of Delaware Application June 7, 1954, Serial No. 434,901

5 Claims. (Cl. 137—445)

This invention pertains to carburetors, and particularly to improved means for actuating a carburetor float controlled fuel valve.

Heretofore, the needle valves for controlling the admission of fuel to carburetor fuel reservoirs have been actuated by float controlled arms. Due to the arrangement in prior carburetors, the needle valve has been subjected to vibrations which resulted in a variable fuel level in the reservoir, the disadvantages of which are readily apparent. This invention relates to means for actuating a float controlled fuel valve, which means are not effected by vibration. Accordingly, among my objects are the provision of means for preventing erratic operation of a float control valve due to vibration; the further provision of a lost motion connection between a float and a valve controlled thereby; and the still further provision of means for effecting positive movement of a valve in response to movement of a float in one direction, while permitting lost motion therebetween during movement of the float in the opposite direction.

The aforementioned and other objects are accomplished in the present invention by incorporating a high rate spring as the lost motion connection between a liquid level responsive member and a valve. Specifically, the stem of the needle valve is operatively connected to a wire tang which extends through aligned openings in a valve actuating lever and a float positioned lever, the wire tang having a bent end disposed beneath the float positioned lever. The two levers are coaxially mounted for pivotal movement on a pin supported in the fuel reservoir, the valve actuating lever having engagement with the needle valve stem, and the float positioned lever being attached to the float. The float positioned lever has a struck-up tang portion which extends through an aperture in the valve actuating lever, the tang portion having a bent end. The tang is surrounded by a high rate compression spring which constitutes a lost motion connection between the two levers. The high rate spring effectively damps vibration and prevents erratic operation of the needle valve.

Operation of the mechanism is as follows. When the liquid level responsive member reaches a level demanding additional fuel, the up-struck tang on the float lever will engage the valve lever, and concurrently therewith the valve stem tang will be engaged by the float lever so as to positively open the needle valve so as to permit the admission of fuel to the reservoir. When the fuel in the reservoir reaches the desired level, the float, acting through the high rate spring, will close the needle valve. Moreover, due to the fact that at this time there is no positive engagement between the two levers, the spring will damp vibrations to which the float is subjected and prevent the transmission thereof in the needle valve.

Further objects and advantages of the present invention will be apparent from the following description, reference being had to the accompanying drawing wherein a preferred embodiment of the present invention is clearly shown.

Figure 1:
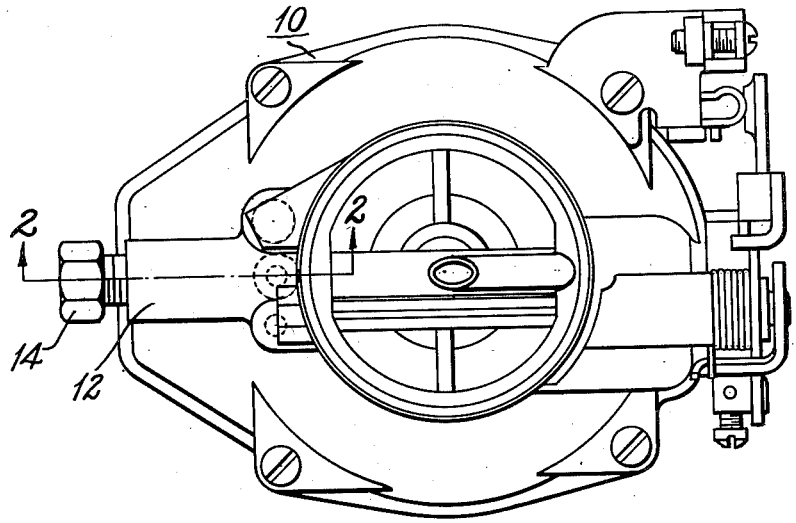
Fig. 1 is a top view, in elevation, of a carburetor incorporating the valve actuating mechanism of this invention.
Figure 2:
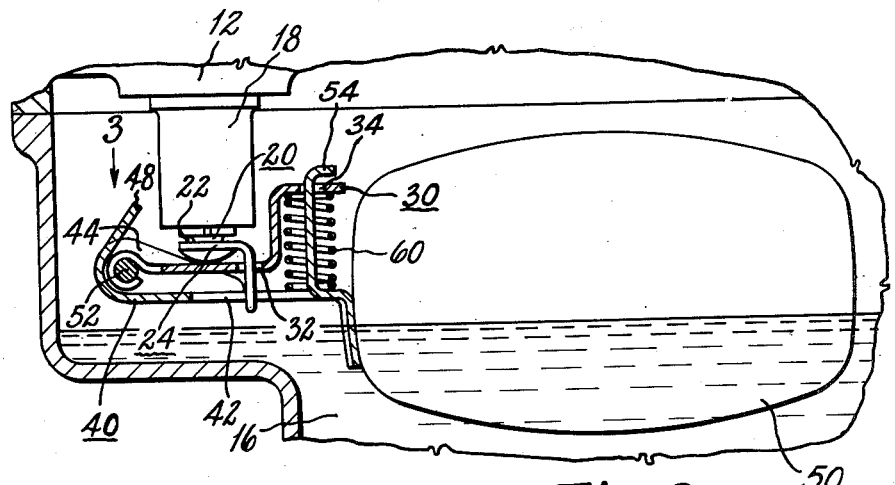
Fig. 2 is an enlarged, fragmentary view, partly in section and partly in elevation, taken along line 2—2 of Fig. 1.

With reference to Fig. 1, the present invention is shown in combination with a conventional carburetor assembly 10 having a tubular projection 12 having a fitting 14 adapted to be connected to the outlet side of a fuel pump, not shown. As seen in Fig. 2, the carburetor includes a fuel reservoir designated generally by the numeral 16, within which it is desired to maintain a predetermined level of fuel. The tubular portion 12 communicates with a needle valve housing 18, which is disposed within the fuel reservoir 16. As the needle valve construction, per se, constitutes no part of the present invention, it will be understood that any conventional valve assembly may be employed. Suffice it to say that the needle valve includes an actuating stem 20, which protrudes from the valve housing 18, as shown in Fig. 2.

Figure 3:
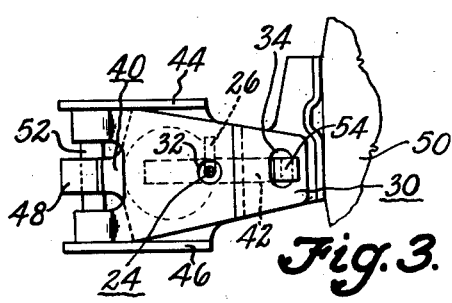
Fig. 3 is a view, in elevation, taken in the direction of arrow 3 in Fig. 2, with certain parts removed.

The stem 20 is formed with an annular groove 22 within which one end of a wire tang 24 is situated. The wire tang 24 extends through aligned openings 32 and 42 of a valve actuating lever 30 and a float positioned lever 40, respectively, and also has a bent end portion 26, as depicted in Fig. 3. The bent end portion 26 of the wire tang 24 is disposed beneath the float positioned lever 40. In prior carburetors, the stem of the needle valve has been arranged to positively engage the float valve arm, or float position lever. Resort was had to this expedient to reduce cost and to simplify the mechanism. However, I have observed that in prior constructions the float and the valve are subject to vibration, which results in an unstable and variable level of fuel in the reservoir. The present invention obviates this problem by interposing a one-way lost motion connection between the needle valve stem and the float position lever.

As is seen particularly in Figs. 2 and 3, one end of the float positioned lever 40 is welded, or otherwise suitably connected, to liquid level responsive member, or float, 50. The other end of the lever 40 has a bifurcated portion, which is pivotally supported on a pin 52 which is mounted in the carburetor housing. The bifurcated end portion of the lever 40 is of channel shape inasmuch as it is formed with upstanding flanges 44 and 46. In addition, the bifurcated end of the lever 40 is formed with an upstanding tang portion 48, which is arranged to engage the needle valve housing 18 so as to form a stop limiting clockwise movement of the float 50, as viewed in Fig. 2. In addition, the float positioned lever 40 is formed with an up-struck tang portion 54, which projects through an opening 34 formed in the valve actuating lever 30, the tang 54 having a bent end portion. The ends of the levers 30 and 40 are normally maintained in spaced relation by means of a high rate compression spring 60, which encompasses the tang 54.

The valve actuating lever 30 is arranged to abut the end of the valve stem 20, as shown in Fig. 2. The other end of the lever 30 is pivotally supported on the pin 52, and is arranged to move freely within the upstanding flanges 44 and 46 of the float positioned lever 40. The wire tang 24 having a bent end portion 26 disposed beneath the lever 40 constitutes means for imparting movement to the valve stem 20 upon counterclockwise movement of the float 50, as viewed in Fig. 2. In addition, the up-struck tang 54 is arranged to engage the lever 30 so as to impart positive movement to this lever during clockwise movement of the float 50. It is to be understood that the needle valve actuating mechanism is of the type including resilient means arranged to move the valve towards an open position, which results in downward movement of the valve stem 20, as shown in Fig. 2, in the absence of means for preventing downward movement of the valve stem.

The improved valve actuating mechanism operates substantially as follows. When the level of fuel in the reservoir 16 drops, thereby resulting in clockwise movement of the float 50 about the pin 52, as viewed in Fig. 2, the lever 40 will engage the wire tang 24, and simultaneously therewith the tang 54 will engage the lever 30. Consequently, the lever 30 will be moved in a clockwise direction about pivot pin 52, thereby permitting downward movement of the valve stem 20, as viewed in Fig. 2. In this manner, fuel will be admitted to the reservoir 16 through suitable passage means, not shown. When the level of fuel within the reservoir 16 reaches a predetermined level, as viewed in Fig. 3, the float 50 will impart counterclockwise movement to the lever 30 through the high rate compression spring 60. In this manner, the needle valve will be closed. It should be noted that during counterclockwise movement of the float valve 50, as viewed in Fig. 2, the only interconnection between the levers 40 and 30, and, hence, between the lever 40 and the valve stem 20, is through the compression spring 60. In effect, the compression spring 60 constitutes a one-way lost motion connection between the two levers, 30 and 40. Moreover, the high rate compression spring 60 will effectively prevent the transmission of vibration from the float to the lever 30 and in this manner prevent erratic operation of the needle valve.

While the embodiment of the present invention as herein disclosed, constitutes a preferred form, it is to be understood that other forms might be adopted.

What is claimed is as follows:

1. In a carburetor, a fuel reservoir, a valve for controlling the admission of fuel to said reservoir, and a liquid level responsive member in said reservoir operatively connected with said valve for actuating the same so as to maintain a predetermined level of fuel in said reservoir, the operative connection between said member and said valve including a pivotally supported lever connected with said member, a valve actuating lever supported about a pivot coincident with said member positioned lever, and means interconnecting said levers comprising a tang on said member positioned lever arranged to engage said valve actuating lever and a compression spring encompassing said tang disposed between said levers for maintaining them in spaced relation, said spring constituting a lost motion means.

2. In combination, a liquid reservoir, a valve for controlling the admission of liquid to said reservoir, and a liquid level responsive member in said reservoir operatively connected with said valve for actuating the same so as to maintain a predetermined level of liquid in said reservoir, the operative connection between said member and said valve including a member positioned lever, one end of which is attached to said member, and the other end of which is supported for pivotal movement, a valve actuating lever supported for pivotal movement about an axis coincident with the axis of pivotal movement of said member positioned lever, means constituting a lost motion connection between said levers during movement of said member positioned lever in one direction, and means for non-resiliently engaging said valve actuating lever during movement of said member positioned lever in the opposite direction.

3. In combination, a liquid reservoir, a valve for controlling the admission of liquid to said reservoir, and a liquid level responsive member in said reservoir operatively connected with said valve for actuating the same so as to maintain a predetermined level of liquid in said reservoir, the operative connection between said member and said valve including a pivotally supported lever connected with said member, a valve actuating lever supported about a pivot coincident with said member positioned lever, and means interconnecting said levers comprising a tang on said member positioned lever arranged to engage said valve actuating lever and a compression spring disposed between said levers for maintaining them in spaced relation, said spring constituting a lost motion means.

4. In combination, a liquid reservoir, a valve for controlling the admission of liquid to said reservoir, and a liquid level responsive member in said reservoir operatively connected with said valve for actuating the same so as to maintain a predetermined level of liquid in said reservoir, the operative connection between said member and said valve including a pivotally supported lever connected to said member, a pivotally supported lever for actuating said valve, resilient means disposed between said levers for damping the transmission of vibration therebetween and constituting lost motion means upon movement of said member positioned lever in one direction, and means for non-resiliently engaging said valve actuating lever during movement of said member positioned lever in said opposite direction.

5. In combination, a liquid reservoir, means for controlling the admission of liquid to said reservoir, and a float in said reservoir operatively connected to said means for actuating the same so as to maintain a predetermined level of liquid therein, the operative connection between said float and said means comprising a pair of levers pivotally supported for movement about the same axis, one of said levers being connected with and positioned by said float, the other of said levers being arranged to control the actuation of said means, resilient means disposed between said levers and arranged to maintain them in spaced relation so as to form a lost motion connection therebetween during movement of said float positioned lever in one direction, said resilient means also damping the transmission of vibration between said two levers, and means for non-resiliently engaging said other lever during movement of said float positioned lever in the opposite direction.

References Cited in the file of this patent

UNITED STATES PATENTS

| 1,598,948 | Watt | Sept. 7, 1926 |
| 2,095,485 | Bassett | Oct. 12, 1937 |
| 2,503,036 | Fricke et al. | Apr. 4, 1950 |